May 17, 1955 N. KNAUS ET AL Re. 24,005

FEEDING MECHANISM FOR SEWING MACHINES

Original Filed Nov. 14, 1951 4 Sheets-Sheet 1

INVENTOR.
Nicholaus Knaus
and Agnes G. Millington
BY William P. Stewart
ATTORNEY WITNESS
William Martin

FEEDING MECHANISM FOR SEWING MACHINES

Original Filed Nov. 14, 1951 4 Sheets-Sheet 2

INVENTOR.
Nicholaus Knaus
and Agnes G. Millington

WITNESS
William Martine

BY William P. Stewart
ATTORNEY

FEEDING MECHANISM FOR SEWING MACHINES

Original Filed Nov. 14, 1951 4 Sheets-Sheet 3

WITNESS

William Martins

INVENTOR.

Nicholaus Knaus
and Agnes G. Millington

BY William P. Stewart
ATTORNEY

FEEDING MECHANISM FOR SEWING MACHINES

Original Filed Nov. 14, 1951 4 Sheets-Sheet 4

WITNESS
William Martins

INVENTOR.
Nicholaus Knaus
and Agnes G. Millington
BY William P. Stewart
ATTORNEY United States Patent Office Re. 24,005
Reissued May 17, 1955

24,005

FEEDING MECHANISM FOR SEWING MACHINES

Nicholaus Knaus, Cranford, and Agnes G. Millington, Clifton, N. J., assignors to The Singer Manufacturing Company, Elizabeth, N. J., a corporation of New Jersey Original No. 2,667,851, dated February 2, 1954, Serial No. 256,242, November 14, 1951. Application for reissue December 14, 1954, Serial No. 475,598

14 Claims. (Cl. 112—209)

Matter enclosed in heavy brackets [ ] appears in the original patent but forms no part of this reissue specification; matter printed in italics indicates the additions made by reissue.

This invention relates to feeding mechanisms for sewing machines, and more particularly to that type of feeding mechanism known as a differential feed in which two work-feeding elements are adapted to be actuated so as to exert unequal feeding actions on the work, thereby either to stretch or full the work as required.

The invention has as a primary object to provide an improved means for adjusting the length of feeding movement of one of a pair of four motion feed-dogs of a differential feeding mechanism during the operation of such mechanism.

A further object of the present invention is to provide indicia means which is so mounted and so actuated as to provide a sewing machine operator at all times with a visual indication as to the degree of differential movement existing between the two feeding elements which comprise a so-called differential feeding mechanism.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
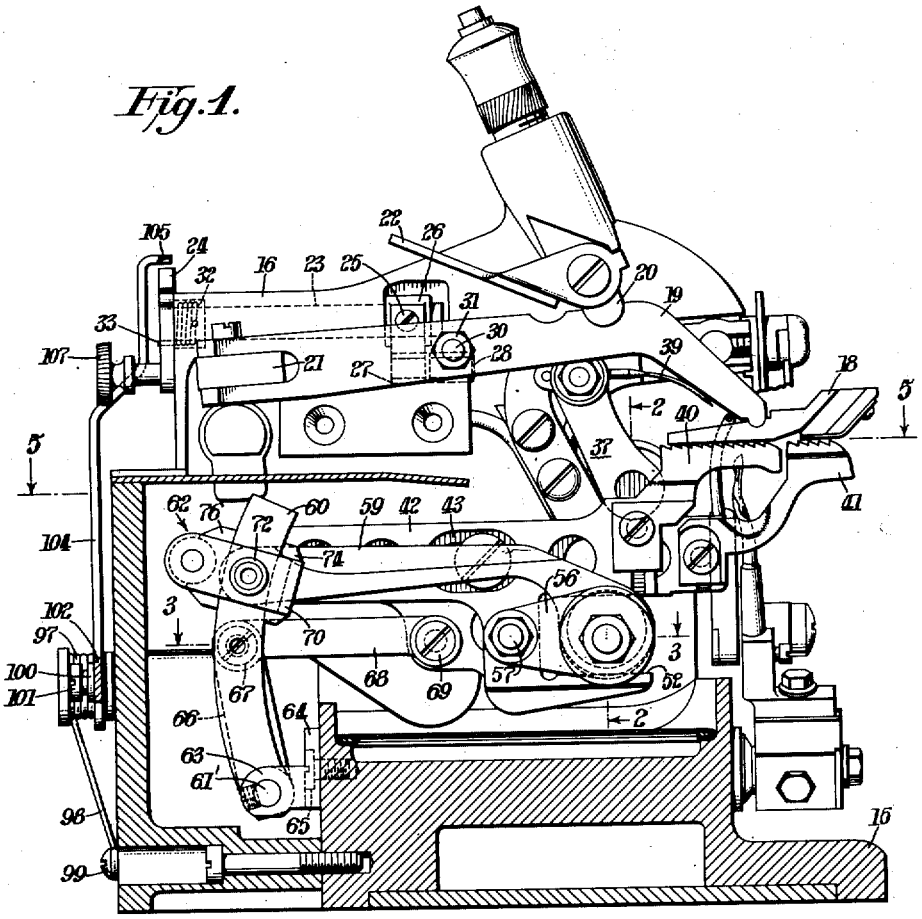
Fig. 1 represents an end elevation, partly in section, of an overseaming machine and showing the improved feeding mechanism.

Referring now to the drawings, the reference numeral 15 denotes the frame or casting of an overseaming machine, 16 the head and 17 the work-support (see Fig. 8) which is carried upon the frame in a conventional manner. A presser-foot 18 is supported on the head 16 and the shank 19 of the foot is engaged by a spring-biased member 20, whereby the foot is normally pressed downwardly toward the work-support 17. The rear portion of the shank 19 is mounted on a universal joint 21 in a conventional manner and a lever 22 is provided for relieving the pressure of the spring-biased member 20.

Treadle-actuated means are provided for raising the shank 19, in opposition to the spring-biased means 20, to permit introduction or adjustment of the work beneath the presser-foot 18. This means comprises a rod 23 journaled in a portion of the machine frame 16 parallel to the shank 19 and carrying at its rear end, a laterally projecting plate 24 adapted to be connected at its free end portion 24' with a chain or other suitable connection, with a conventional knee or foot-actuated treadle, not show. Adjacent its forward end the rod 23 has secured to it, by screws 25, a collar 26 having an offset arm 27 providing a portion 28 underlying a laterally projecting portion 29 of the shank 19. Preferably, but not necessarily the portion 28 of the arm 27 is formed as a roller stud, and a laterally projecting portion of the shank 19 comprises a shoulder stud having a shank 30 extending through an aperture in the shank 19 and secured thereto by a nut 31.

Figure 11:
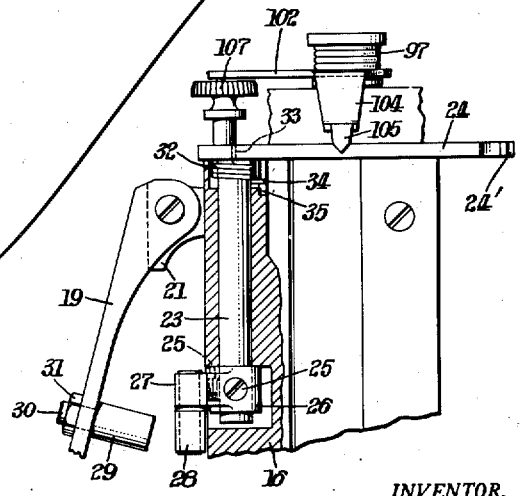
Fig. 11 represents a fragmentary plan view of the left hand portion of the machine shown in Fig. 1, with a part of the machine frame in section.

The rod 23 is normally biased clockwise, as viewed in Fig. 11 by a coil spring 32 surrounding the rod, and having one end 33 fitted to an aperture in the arm 24. The opposite end 34 of this spring projects through a slot 35 in a portion of the frame 16. For a more detailed description of such a presser-foot lifting mechanism, reference may be had to U. S. Patent No. 2,419,494, dated Apr. 22, 1947.

Figure 2:
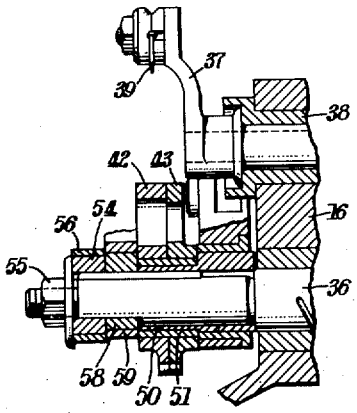
Fig. 2 represents a sectional view taken substantially along the line 2—2 of Fig. 1.
Figure 3:
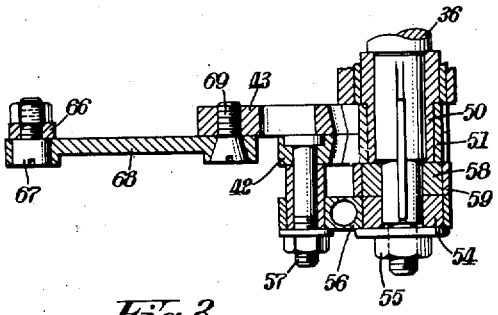
Fig. 3 represents a sectional view taken substantially along the line 3—3 of Fig. 1.

The machine is provided with a main rotary shaft 36 (see Fig. 2) which is journaled in the frame 15, and this shaft, through a link not herein illustrated, is connected with a needle carrier 37 pivoted in a bushing 38 so that the rotation of the shaft 36 effects the oscillation of the carrier within its bushing 38. A needle 39 is mounted in the carrier 37 and the oscillation of the latter causes the needle to reciprocate and penetrate the goods that is supported upon the work-support 17. Suitable stitch-forming implements or loopers cooperate with the needle to effect the formation of the overseaming stitches, but as these loopers and the manner of and the means for their actuation form no part of the present invention, their illustration and further description are not deemed necessary.

For a more complete description and illustration of a machine of the present type, reference may be had to United States Patent No. 2,238,796, dated April 15, 1941.

Figure 5:
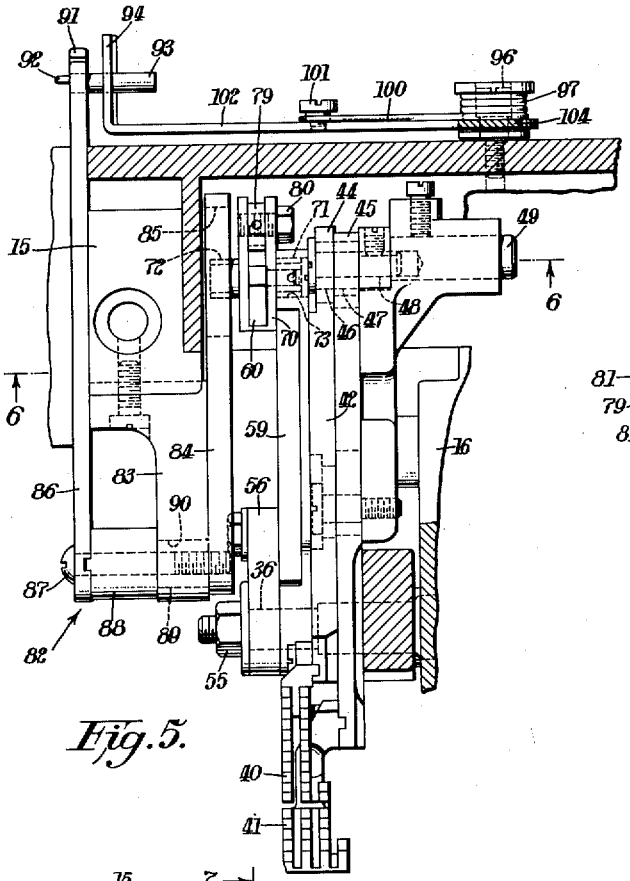
Fig. 5 represents a sectional view taken substantially along the line 5—5 of Fig. 1.
Figure 6:
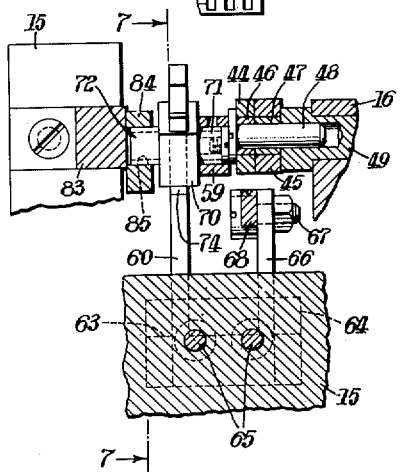
Fig. 6 represents a sectional view taken substantially along the line 6—6 of Fig. 5.

The present work-feeding mechanism is of the differential type including a main feed-dog 40 and an auxiliary feed-dog 41 which are mounted, respectively, on the side by side main and auxiliary feed-dog carriers or bars 42 and 43 slidingly supported at their forked rear ends 44 and 45 upon blocks 46 and 47 (see Figs. 5 and 6). Each of these blocks 46 and 47 is appropriately apertured so as to be snugly entered by a pin 48 which is force-fitted within an apertured bushing 49 secured within a portion of the main frame 16. As will later be described in more detail, the bars 42 and 43 are actuated in a manner such that they will both oscillate and move longitudinally about and relative to the pin 48 of which the longitudinal axis is common to both of the feed-bars.

The feed-bars 42 and 43 receive their rising and falling movements from a feed-lift eccentric 50 on the main shaft 36; said eccentric being surrounded by the usual bearing block 51 which fits in ways 52 and 53 in the feed-bars 42 and 43.

The feed and return movements are imparted to the main feed-bar 42 from a main feed eccentric 54 removably and replaceably keyed upon the outer end of the main shaft 36 and held thereon by a nut 55. The main feed-eccentric 54 is connected by a first pitman 56 to a lateral post 57 rigid with the main feed-bar 42. Alteration of the amplitude of the feed and return movements of the main feed-dog 40 is effected by substitution of feed eccentrics of the desired eccentricities, for that eccentric 54 illustrated in the present machine.

For imparting feed and return movements to the auxiliary feed-bar 43, the main shaft 36 is provided with an auxiliary feed-eccentric 58 keyed upon the shaft 36 and removable therefrom in the same manner as the main feed-eccentric 54. Embracing the eccentric 58 is the forward portion of a second pitman 59 of which the rearward portion is pivotally and slidably connected with a curved arm 60 of a rocker 61 by a means of a slide-block generally designated by the numeral 62. The rocker 61 is mounted upon a horizontal pin 61' which is supported within the outwardly projecting ears 63 of a plate 64 secured upon the main frame casting 15 by means of appropriate screws 65. Thus, the rocker 61 with its two arms 60 and 66 pivot about the longitudinal axis of the pin 61' in response to the movements of the second pitman 59. The upper end portion of the rocker arm 66 is pivotally secured, by means of a bolt 67, to one end portion of a link 68 whose other end portion is pivotally secured to the auxiliary feed-bar 43 by means of a bolt 69. From this it is to be understood that the rotation of the main shaft 36 will effect feed and return movements of the auxiliary feed-bar 43 through the medium of the eccentric 58, the second pitman 59, the rocker 61 and the link 68.

The arm 60 is of arcuate form, the axis of curvature being the center of the shaft 36. The amount of lengthwise movement transmitted to the feed-bar 43 from any given degree of oscillation of the shaft 36 depends upon the setting of the block 62 upon the arm 60. This setting may be varied in a manner as will hereinafter be described.

Figure 4:
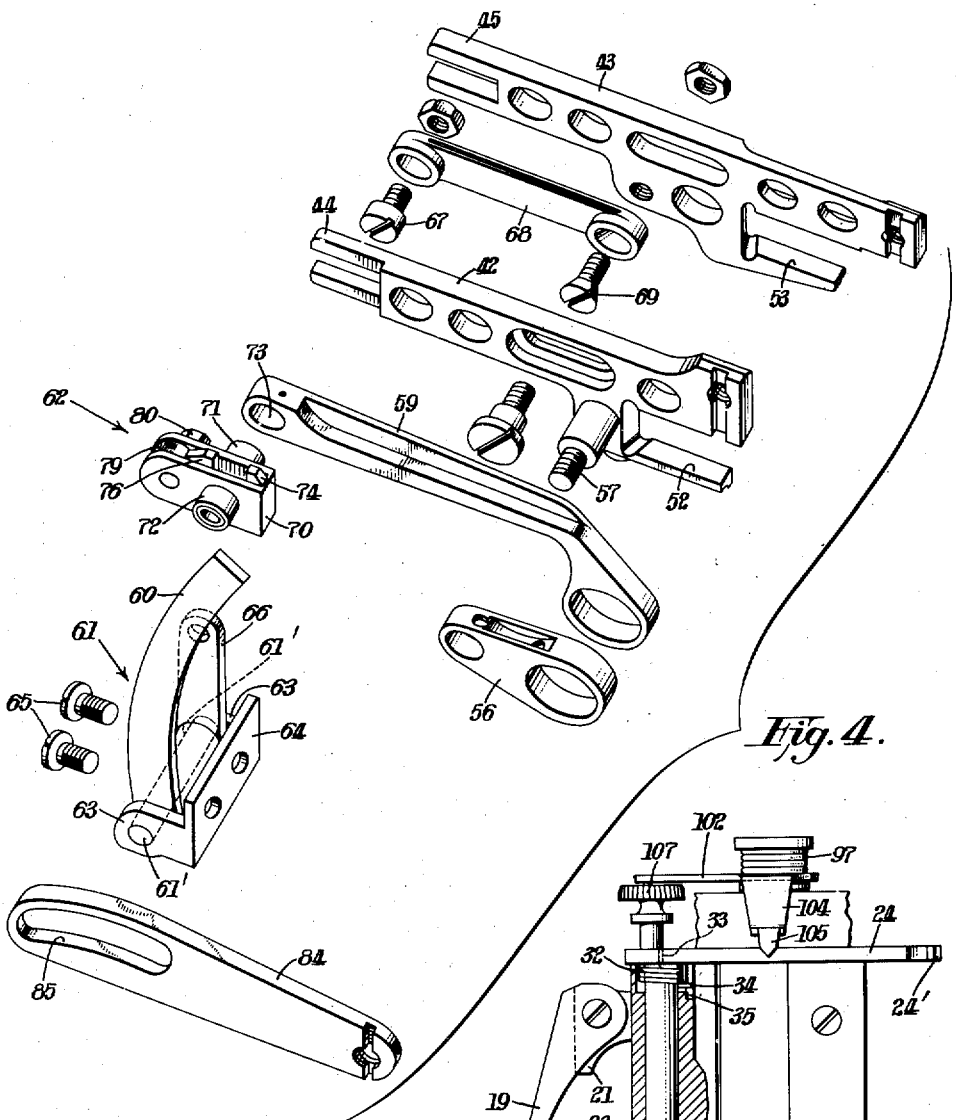
Fig. 4 represents a disassembled perspective view of the main and auxiliary feed-bars and their actuating means.
Figure 7:
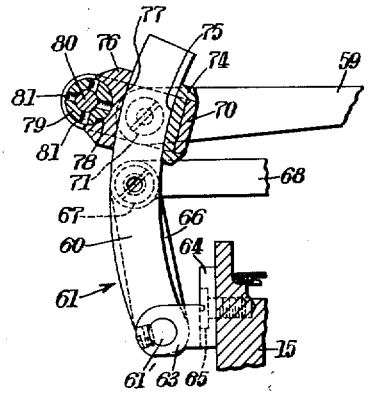
Fig. 7 represents a sectional view taken substantially along the line 7—7 of Fig. 6.

The above noted slide-block 62 comprises a U-shaped strap 70, provided with a pair of coaxially aligned studs 71 and 72 of which stud 71 enters an aperture 73 provided in the rear end portion of the second pitman 59. As shown most clearly in Figs. 4 and 7, the strap 70 carries a shoe 74 having a convex face 75 which engages the concave edge of the arm 60, and a shoe 76 having a concave face 77 which engages the convex edge of the arm 60. The shoe 76 also has on its outer face a concave surface 78 adapted to receive the periphery of a washer 79 journaled eccentrically on a clampscrew 80 connecting the free ends of the strap 70. The washer 79 is provided with a plurality of radially extending holes 81 adapted to receive the end of the pin, or other element, by means of which the eccentric washer may be rotated on the screw 80, thereby to shift the shoe 76 towards the arm 60 and compensate for wear on the parts.

As hereinabove mentioned, the amount of lengthwise movement transmitted to the auxiliary feed-bar 43 from any given degree of oscillation of the shaft 36 is dependent upon the setting of the strap 70 upon the arm 60. For effecting this adjustment of the strap 70 lengthwise of the arm 60, the present machine is provided with a substantially U-shaped crank, generally designated by the numeral 82, Fig. 5, which crank is pivotally mounted upon a protruding portion 83 of the frame 15. More specifically, the crank 82 includes an arm 84 having provided in one end portion thereof a longitudinal slot 85 which is adapted to receive the stud 72 of the strap 70. The other end portion of the arm 84 is secured to its associated arm 86 by means of a screw 87 and two spacer sleeves 88 and 89 of which the latter is pivotally mounted within an aperture 90 provided in the projecting portion 83 of the machine frame. As may be best understood by reference to Figs. 5 and 8, the arm 86 of the crank 82 is provided with a slotted end portion 91 which projects rearwardly of the sewing machine frame so as to receive a chain 92 which may be connected to a foot treadle for the purpose of shifting the arm downwardly against the action of a spring which will be hereinafter described. This downward movement of the arm 86 lowers the slide-block 62 lengthwise of the arcuate arm 60 so as to adjust the amplitude of movement of the rocker 61 to the end that the amplitude of movement of the auxiliary feed-bar 43 will be varied relative to the amplitude of movement of the main feed-bar 42, thereby causing a differential feeding movement. In this connection it is to be understood that when the slide block 62 is in the position illustrated in Fig. 1 of the drawings, the amplitude of movement of the auxiliary feed-bar 43 is substantially the same as that of the main feed-bar 42 so that no differential feeding movement is effected between the main and auxiliary feed-bars 42 and 43. However, as the crank-arm 86 is lowered, the slide-block 62 will be moved downwardly along the rocker arm 60 so as progressively to increase the amplitude of longitudinal movement of the auxiliary feed-bar 43 so that a gathering feed action will be effected.

Figure 9:
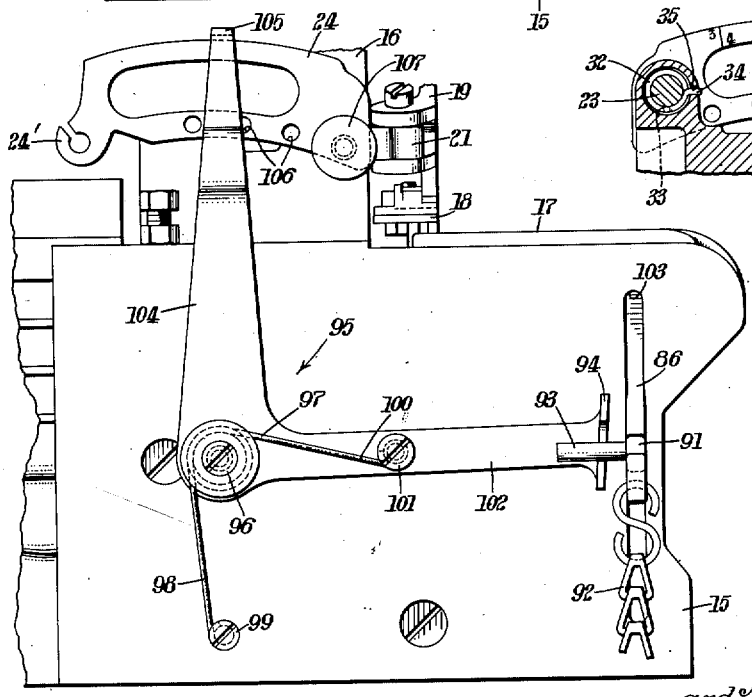
Fig. 9 represents a rear elevation view of a sewing machine embodying the present invention and illustrates the rear portion of an indicia plate and indicia finger which cooperate together to give the sewing machine operator a visual indication of the degree of differential movement which exists between the main and auxiliary feed-dogs.

As is best disclosed in Figs. 5 and 9, the free end portion of the crank arm 86 is provided with a pin 93 which enters a slotted portion 94 of a bell-crank lever generally designated by the numeral 95. This bell-crank lever 95 is mounted on a stud 96 threaded directly into the sewing machine frame. A coil spring 97 wrapped about the stud 96 has its one free end portion 98 anchored by means of a screw 99 to the machine frame while its other end portion 100 is anchored by means of a screw 101 to one arm 102 of the bell-crank lever 95. This spring is so arranged as normally to maintain the arm 86 of the crank 82 in a horizontal position, whereby the pivot block 62 will be in the position illustrated in Fig. 1 to the end that the longitudinal feeding movements of the feed-bars 42 and 43 will be exactly the same. The upward movement of the crank arm 86 is arrested by the top wall of a slot 103 through which the arm projects.

Figure 8:
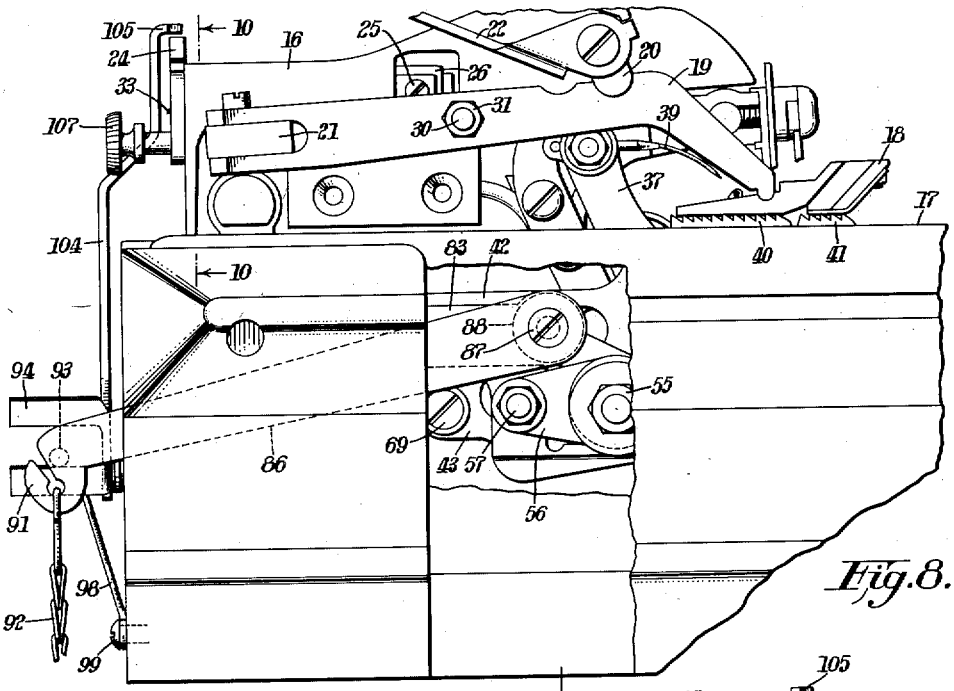
Fig. 8 represents an end elevation of an overseaming machine embodying the present invention and illustrates the machine with a portion of the frame end wall broken away so as to illustrate a portion of the treadle-controlled adjusting means for the auxiliary feed-bar.
Figure 10:
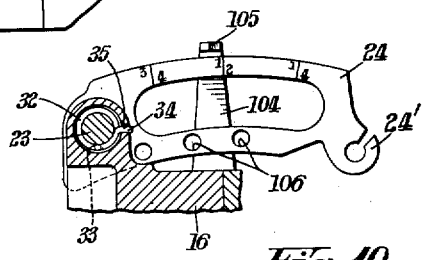
Fig. 10 represents a fragmentary sectional view taken substantially along the line 10—10 of Fig. 8.

The upstanding arm 104 of the bell-crank lever 95 projects upwardly above the work-supporting surface 17 of the sewing machine and it is provided with an indicia finger 105 which is adapted to track across the upper arcuate portion of the presser-bar lifting arm or plate 24. As may be best observed from Fig. 10 of the drawings, the front portion of the plate 24 is provided with appropriate indicia so that as the bell-crank 95 is pivoted about the screw 96, under the control of the operator, the indicia finger 105 will give the operator a visual indication as to the amount of differential feeding action effected. Referring particularly to Figs. 1, 8 and 9, it is to be observed that the rear portion of the presser-bar lifting plate 24 is provided with a plurality of threaded apertures 106 of which each is adapted to receive a thumb screw 107, the function of which is to act as a stop for the bell-crank lever 95 as the latter is moved in a clockwise direction as viewed in Fig. 9. The apertures 106 may be so placed within the plate 24 as to provide index means whereby the thumb screw 107 may be selectively positioned to the end that upon the lowering of the chain 92 the slide-block 62 will be shifted to a predetermined position, thus giving the operator automatically a desired amount of differential feeding action between the main and auxiliary feeding mechanisms.

From the foregoing, it will be apparent that this invention has provided an improved feeding mechanism for sewing machines having main and auxiliary feed-dogs, which mechanism is provided with novel and meritorious means for adjusting the feed-advance stroke of the auxiliary feed-dog during the operation of the machine so as to provide a wide range of differential feed action. Furthermore, the present feed adjusting means is provided with a simple but effective indicia device which functions to give the sewing machine operator a visual indication at all times of the degree of differential feeding action effected by the adjusting mechanism.

Having thus set forth the nature of the invention, what we claim herein is:

1. Sewing machine feed mechanism including in combination, a pair of eccentrics, a normally stationary feed guide, a feed-dog carrier supported for oscillatory and reciprocatory movements with one end thereof slidably engaging said feed guide and with its other end embracing one of said eccentrics, a rocker, a link connecting said rocker with said carrier for imparting reciprocatory movements to said carrier, a slide block movably carried upon said rocker, a pitman having one end embracing the other of said eccentrics and its other end connected to said slide block for actuating said rocker, and means connected with said slide block for shifting the same lengthwise of said rocker thereby to vary the amplitude of swing imparted to said rocker.

2. Sewing machine feed mechanism including in combination, a pair of eccentrics, a feed-dog carrier supported for oscillatory and reciprocatory movement and embracing one of said eccentrics, a rocker having two arms and being pivotally mounted about a fixed axis, a link connecting one arm of said rocker with said carrier for imparting reciprocatory movements to said carrier, a slide block shiftably carried upon the other arm of said rocker, a pitman having one end embracing the other of said eccentrics and its other end connected to said slide block for swinging said rocker about its fixed axis, and means connected with said slide block for shifting the same lengthwise of its associated rocker arm thereby to vary the amplitude of swing imparted to said rocker.

3. Sewing machine feed mechanism including in combination, a rotary shaft, a pair of eccentrics carried upon said shaft, a normally stationary feed guide, a feed-dog carrier supported for oscillatory and reciprocatory movements with one end thereof slidably engaging said feed guide and with its other end embracing one of said eccentrics, a rocker having two arms and being pivotally mounted about a fixed axis, a link connecting one arm of said rocker with said carrier for imparting reciprocatory movements to said carrier, a slide block slidably mounted upon the other arm of said rocker, a pitman having one end embracing the other of said eccentrics and its other end connected to said slide block for swinging said rocker about its fixed axis, and means connected with said slide block for shifting the same lengthwise of its associated rocker arm thereby to vary the amplitude of swing imparted to said rocker.

4. A sewing machine comprising a frame, a pair of eccentrics, a feed-dog carrier supported for oscillatory and reciprocatory movement and embracing one of said eccentrics, a rocker having pivotal connection with said carrier for imparting reciprocatory movements to said carrier, a pitman having one end embracing the other of said eccentrics and its other end pivotally and slidably connected to said rocker for actuating said rocker, an indicia plate mounted upon said frame, an indicia finger mounted adjacent said plate for tracking across the face thereof, and means including a manually adjustable lever operatively connected with said pitman and said indicia finger for sliding the point of connection of said pitman and said rocker thereby to vary the amplitude of longitudinal motion transmitted to said carrier and for shifting said indicia finger relative to said indicia plate.

5. A sewing machine comprising a frame, a pair of eccentrics, a feed-dog carrier supported for oscillatory and reciprocatory movements and embracing one of said eccentrics, a rocker having pivotal connection with said carrier for imparting reciprocatory movements to said carrier, a slide block shiftably carried upon said rocker, a pitman having one end embracing the other of said eccentrics and its other end connected to said slide block for actuating said rocker, an indicia plate mounted upon said frame, an indicia finger mounted adjacent said plate for tracking across the face thereof, and means connected with said slide block and said indicia finger for shifting said slide block lengthwise of said rocker thereby to vary the amplitude of swing imparted to said rocker and for shifting said indicia finger relative to said plate.

6. Differential feeding mechanism for a sewing machine, comprising, a plurality of eccentric elements, a pair of feed-dog carriers supported for oscillatory and reciprocatory movement with each carrier embracing an eccentric element so as to be oscillated thereby, a first pitman connecting one of said eccentric elements with a first of said carriers for imparting reciprocatory movement thereto, a rocker having pivotal connection with the second of said carriers for imparting reciprocatory movements to said carrier, a second pitman having one end embracing one of said eccentric elements and its other end pivotally and slidably connected to said rocker for actuating the same, and means including a manually adjustable lever operatively connected with said second pitman for sliding the point of connection of such pitman and said rocker thereby to vary the amplitude of reciprocatory motion transmitted to said second carrier.

7. A differential feeding mechanism for a sewing machine having a frame, comprising, a pair of feed-dog carriers, a support carried by said frame and forming an axis common to both carriers with reference to which axis the carriers have pivotal and longitudinal movements, a rotary shaft journaled in said frame, a plurality of eccentric elements carried by said shaft, said two carriers each being connected to an eccentric element so as to be pivotally actuated thereby, a first pitman connecting one of said eccentric elements with a first of said two carriers for imparting longitudinal movement thereto, a rocker arm pivotally mounted upon said frame about a fixed axis, a second pitman having one end thereof embracing one of said eccentric elements and its other end pivotally and slidably connected with said rocker arm for oscillating the latter about its pivot axis, a link connecting said rocker arm with the second of said carriers for imparting longitudinal movement thereto, and means including a manually adjustable lever operatively connected with said second mentioned pitman for sliding the point of connection of said second pitman with said rocker arm thereby to vary the amplitude of longitudinal motion transmitted to said second carrier.

8. Differential feeding mechanism for a sewing machine, comprising, a plurality of eccentric elements, a pair of feed-dog carriers supported for oscillatory and reciprocatory movement with each carrier embracing an eccentric element so as to be oscillated thereby, a first pitman connecting one of said eccentric elements with a first of said carriers for imparting reciprocatory movement thereto, a rocker having pivotal connection with the second of said carriers for imparting reciprocatory movements to such carrier, a second pitman having one end embracing one of said eccentric elements and its other end pivotally and slidably connected to said rocker for actuating the same, an indicia plate, an indicia finger mounted for tracking across said plate, and means including a manually adjustable lever operatively connected with said second pitman and said indicia finger for sliding the point of connection of such pitman and said rocker thereby to vary the amplitude of reciprocatory motion transmitted to said second carrier and for shifting said indicia finger relative to said indicia plate.

9. In a sewing machine having a frame, a rotary shaft journaled in said frame, *normally stationary feed guide means carried by said frame,* a feed-dog carrier slidably pivoted [to said frame] *at its rear end upon said feed guide means* for oscillatory and reciprocatory movement, means carried by said shaft and connected with *the front end of* said carrier for imparting oscillatory motion thereto, a rocker pivotally secured to said frame, a slide block shiftably carried upon said rocker, means connecting said shaft with said slide block for swinging said rocker about its pivot, a link connecting said rocker with said carrier thereby to impart reciprocatory movements to said carrier, and means for shifting said slide block on said rocker thereby to vary the amplitude of reciprocatory movements imparted to said carrier.

10. Sewing machine feed mechanism including in combination, a rotary shaft, a pair of eccentrics carried upon said shaft, a feed-dog carrier supported for oscillatory and reciprocatory movement and embracing one of said eccentrics, a rocker having pivotal connection with said carrier for imparting reciprocatory movements to said carrier, a pitman having one end embracing the other of said eccentrics and its other end pivotally and slidably connected to said rocker for actuating said rocker, and means operatively connected with said pitman for sliding the point of connection of said pitman and said rocker thereby to vary the amplitude of reciprocatory motion transmitted to said carrier.

*11. Differential feeding mechanism for a sewing machine having a frame, comprising, a rotary shaft, a plurality of eccentric elements carried upon said shaft, normally stationary feed guide means carried by said frame, a pair of feed-dog carriers supported at their rear ends upon said feed guide means for oscillatory and reciprocatory movement with each carrier embracing at its front end an eccentric element so as to be oscillated thereby, a pitman member having its forward end embracing one of said eccentric elements and its rear end connected directly with an intermediate portion of a first of said carriers for imparting reciprocatory movement thereto, a rocker arm pivotally mounted upon said frame about a fixed axis, means pivotally connecting one of said eccentric elements with said rocker arm thereby to rock the latter about its axis, a link member connecting said rocker with the second of said carriers for imparting reciprocating movements to such carrier, and means to effect a relative shift between the two rocker-arm connections thereby to vary the amplitude of reciprocation of said second carrier.*

*12. Differential feeding mechanism for a sewing machine having a frame, comprising a pair of feed-dog carriers supported upon said frame for oscillatory and reciprocatory movements, a pair of pitman members, driven eccentric elements upon which the forward ends of said pitman members are journaled, a first of said pitman members having its rear portion pivotally connected to an intermediate portion of a first of said feed-dog carriers thereby to reciprocate such carrier, a rocker-arm pivotally mounted upon said frame about a fixed axis and being connected with the rear portion of the second of said pitman members so as to be rocked thereby, a link member connecting said rocker-arm with an intermediate portion of the second feed-dog carrier thereby to reciprocate such carrier, and means including a shiftable element to vary the amplitude of reciprocation of said second feed-dog carrier.*

*13. Differential feeding mechanism for a sewing machine having a frame, comprising, a pair of feed-dog carriers supported upon said frame for oscillatory and reciprocatory movements, a pair of pitman members, driven eccentric elements upon which the forward ends of said pitman members are journaled, a first of said pitman members having its rear portion pivotally connected to an intermediate portion of a first of said feed-dog carriers thereby to reciprocate such carrier, a rocker-arm pivotally mounted upon said frame about a fixed axis and being connected with the rear portion of the second of said pitman members so as to be rocked thereby, a link member connecting said rocker-arm with an intermediate portion of the second feed-dog carrier thereby to reciprocate such carrier, and means to effect a relative shift between the rocker-arm connections of said link and said second pitman thereby to vary the amplitude of reciprocation of said second feed-dog carrier.*

*14. Differential feeding mechanism for a sewing machine having a frame and a rotary shaft journaled in said frame, comprising, a plurality of eccentric elements carried by said rotary shaft, a pair of feed-dog carriers supported upon said frame for oscillatory and reciprocatory movements with each carrier embracing an eccentric element so as to be oscillated thereby, a pair of pitman members each being journaled at its forward end upon one of said eccentric elements, a first of said pitman members having its rear portion pivotally connected to an intermediate portion of a first of said feed-dog carriers thereby to reciprocate such a carrier, a rocker-arm pivotally mounted upon said frame about a fixed axis and being connected with the rear portion of the second of said pitman members so as to be rocked thereby, a link member connecting said rocker-arm with an intermediate portion of the second feed-dog carrier thereby to reciprocate such carrier, and operator-influenced means to effect a relative shift between the rocker-arm connections of said link and said second pitman member thereby to vary the amplitude of reciprocation of said second feed-dog carrier.*

References Cited in the file of this patent or the original patent

UNITED STATES PATENTS

| | | |
|---|---|---|
| 1,071,818 | Stedman | Sept. 2, 1913 |
| 1,231,824 | Weis | July 3, 1917 |
| 1,326,026 | Chalman | Dec. 23, 1919 |
| 1,327,647 | Weis | Jan. 13, 1920 |
| 1,663,490 | Berger | Mar. 20, 1928 |
| 1,864,502 | Maier | June 21, 1932 |
| 2,341,448 | Knaus | Feb. 8, 1944 |